(12) United States Patent
Collins et al.

(10) Patent No.: US 11,541,736 B2
(45) Date of Patent: Jan. 3, 2023

(54) MULTIPLE POSITION VEHICLE COVER

(71) Applicants: Stuart E Collins, Clarkston, MI (US); Kyle Neighbors, Milford, MI (US)

(72) Inventors: Stuart E Collins, Clarkston, MI (US); Kyle Neighbors, Milford, MI (US)

(73) Assignee: FCA US LLC, Auburn Hills, MI (US)

( * ) Notice: Subject to any disclaimer, the term of this patent is extended or adjusted under 35 U.S.C. 154(b) by 857 days.

(21) Appl. No.: 16/431,306

(22) Filed: Jun. 4, 2019

(65) Prior Publication Data
US 2020/0384840 A1 Dec. 10, 2020

(51) Int. Cl.
*B60J 11/02* (2006.01)
*B60J 11/04* (2006.01)
*B60J 7/06* (2006.01)

(52) U.S. Cl.
CPC ............ *B60J 11/025* (2013.01); *B60J 7/068* (2013.01); *B60J 11/04* (2013.01); *B60Y 2200/10* (2013.01)

(58) Field of Classification Search
CPC ..... B60J 7/068; B60J 7/085; B60J 7/10; B60J 11/025; B60J 11/04; B60J 11/02; B60J 7/06; B60Y 2200/10
USPC ................................... 296/98, 99.1; 160/66
See application file for complete search history.

(56) References Cited

U.S. PATENT DOCUMENTS

| | | | | |
|---|---|---|---|---|
| 4,679,847 | A  * | 7/1987 | Dirck | B60J 7/106 296/218 |
| 6,505,880 | B1 * | 1/2003 | Castro | B60J 7/10 296/147 |
| 6,619,719 | B1 * | 9/2003 | Wheatley | B60J 7/085 296/100.18 |
| 6,641,201 | B1 | 11/2003 | Pietryga et al. | |
| D537,031 | S  * | 2/2007 | Hoy | D12/401 |
| D593,926 | S  * | 6/2009 | Buck | D12/404 |
| 7,828,634 | B2 * | 11/2010 | Jiang | B01L 3/502707 451/526 |
| 8,408,623 | B1 | 4/2013 | McAuliff | |
| 9,956,857 | B1 | 5/2018 | Singer | |
| 2018/0290529 | A1 * | 10/2018 | Ching | B60J 11/04 |

FOREIGN PATENT DOCUMENTS

JP  3175605 U  5/2012

* cited by examiner

*Primary Examiner* — D Glenn Dayoan
*Assistant Examiner* — Veronica M Shull
(74) *Attorney, Agent, or Firm* — Ralph E. Smith

(57) ABSTRACT

A cover for a vehicle having a first compartment and a second compartment includes a first section, a second section and an intermediate section. The first section includes at least one connector and is adapted to overlie the first compartment. The second section includes at least one connector and the intermediate section is located between the first section and the second section. In a first position the cover defines a first effective surface area, and the first section is in a first position, the second section is in a first position, and the intermediate section is not parallel to the first section and second section. In a second position, the cover defines a second effective surface area that is less than the first effective surface area, and either or both of the first section and the second section is in a second position.

15 Claims, 3 Drawing Sheets

MULTIPLE POSITION VEHICLE COVER

FIELD

The present disclosure relates to a cove for more than one compartment of a vehicle.

BACKGROUND

Some motor vehicles include a convertible top that when deployed overlies a passenger compartment of the vehicle, and which can be retracted so that the convertible top does not overlie the passenger compartment. Some motor vehicles include a roof panel or cover that overlies a passenger compartment when installed on the vehicle and which can be entirely removed from the vehicle. And some motor vehicles include cargo or storage compartments or areas that may be selectively covered by a removable panel. In a vehicle having both a passenger compartment and a cargo compartment, a removable roof panel may be stored in the cargo compartment when removed. But if sufficient space does not exist in the cargo compartment, then the removable panel is typically stored separate from the vehicle. Similarly, a cargo compartment cover, when removed, is stored separately from the vehicle. Problems arise when the vehicle has been moved from the location including one or both of the roof panel and cargo compartment cover and either or both of these components are needed.

SUMMARY

In at least some implementations, a cover for a vehicle having a first compartment and a second compartment spaced from the first compartment, includes a first section, a second section and an intermediate section. The first section includes at least one connector and has a first position and a second position, and the first section is adapted to overlie the first compartment. The second section includes at least one connector and has a first position and a second position. The intermediate section is located between the first section and the second section. The cover has a first position defining a first effective surface area of the cover, and when the cover is in the first position, the first section is in its first position, the second section is in its first position, and the intermediate section is not parallel to the first section and second section. And the cover has a second position defining a second effective surface area that is less than the first effective surface area, and when the cover is in the second position, either or both of the first section and the second section is in its second position.

In at least some implementations, the intermediate portion is connected at a first end to the first section and the intermediate portion is connected at a second end to the second section. At least a portion of the intermediate section may be transparent or include an opening without material covering the opening. The opening or transparent portion may define a rear window of a passenger compartment of the vehicle.

In at least some implementations, the first section includes a main area and the second section includes a main area, and the main area of the first section does not overlap the main area of the second section in the first position of the first section, and the main area of the first section overlaps at least part of the main area of the second section in the second position of the first section. The main area of the first section may be complementary in orientation to the main area of the second section when the second section is in its first position and the first section is in its second position. In at least some implementations, the first section hinges or bends relative to the intermediate section at a joint between the first section and intermediate section, and the intermediate section hinges or bends relative to the second section at a joint between the intermediate section and the second section. In at least some implementations, the cover is alternately folded about the joints to position the intermediate section between the first section and second section when the first section is in its second position. The first section may include a connector that is releasably connected to a connector of the second section when the first section is in its second position and the second section is in its first position.

In at least some implementations, in the second position of the first section, the first section may be rolled upon itself or upon one or both of the intermediate section and second section, and the first section has a first effective surface area in the first position and the first section has a second effective surface area that is smaller than the first surface area when the first section is in the second position. In at least some implementations, in the second position of the second section, the second section may be rolled upon itself or upon one or both of the intermediate section and first section, and the second section has a first effective surface area in the first position and the second section has a second effective surface area that is smaller than the first surface area when the second section is in the second position. In at least some implementations, the first section may be in the first or second position when the second section is in the first or second position.

In at least some implementations, a vehicle includes a passenger compartment arranged to contain one or more occupants, a second compartment located at least partially spaced from the passenger compartment; and a cover having at least one connector adapted to be releasably connected to the vehicle. The cover has a first section, a second section and an intermediate section. The first section in a first position overlies at least part of the passenger compartment and in a second position overlies less of the passenger compartment than when in the first position. The second section in a first position overlies at least part of the second compartment and in a second position overlies less of the second compartment than when in the first position. And the intermediate section interconnects the first section and the second section, and the intermediate section has a main area that in a first position of the intermediate section is not covered by either of the first section and the second section. When the intermediate section is in a second position the main area is covered by one or both of the first section and second section.

In at least some implementations, the at least one connector includes a connector coupled to the first section and wherein the vehicle includes a mating connector that when coupled to the connector coupled to the first section retains the first section in its first position. In at least some implementations, the at least one connector includes a connector coupled to the second section and wherein the vehicle includes a mating connector that when coupled to the connector coupled to the second section retains the second section in its first position.

In at least some implementations, the first section may be moved to its second position wherein the first section is received over the second section when the second section is in its first position, and wherein the first section and/or second section includes a connector to couple the first section to the second section when the first section is in its second position and the second section is in its first position.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
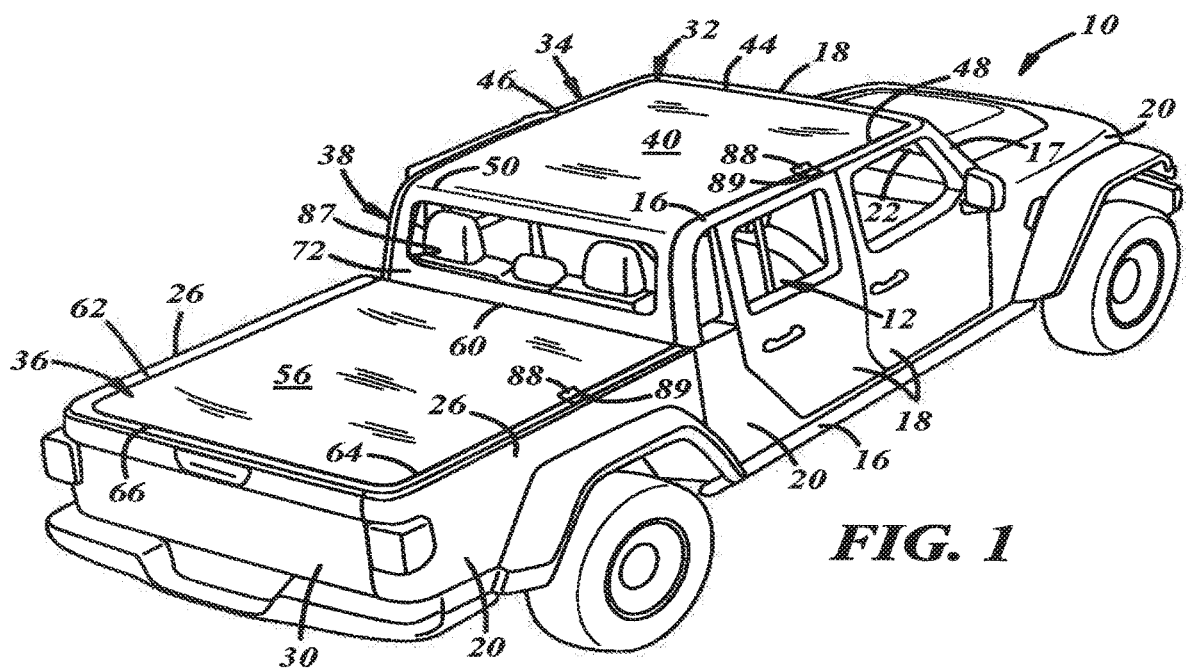
FIG. 1 is a perspective view of a vehicle having a cargo compartment and a passenger compartment, and a cover in a first position overlying both compartments.

Referring in more detail to the drawings, FIG. 1 illustrates a vehicle 10 that includes a first compartment 12 and a second compartment 14 that is at least partially spaced from the first compartment 12. In at least some implementations, the first compartment is a passenger compartment 12 arranged to receive one or more occupants of the vehicle and the second compartment is a cargo compartment 14. The vehicle 10 may include a support structure 16 that includes supports for a vehicle roof, doors 18, body panels 20, and other vehicle components. The doors, panels and/or support structure define part of the passenger compartment 12 which may also be defined by a front wall that includes or is defined by a windshield 22 that may be carried by portions of the support structure 16 (e.g. A-pillars 17 and a cross beam 18 between the A-pillars). The support structure 16 and/or vehicle panels 20 may define at least part of the cargo compartment 14 which may include a bottom wall 24, sidewalls 26 that extend upwardly from opposed sides of the bottom wall 24, a front wall 28 that extends upwardly from the bottom wall 24 and is coupled to the front end of the sidewalls, and a rear wall 30 at the rear end of the sidewalls 26 that may include or be defined by a movable tailgate.

To selectively cover all or part of both the first compartment 12 and the second compartment 14, a cover 32 selectively overlaps portions of the vehicle and may be arranged in different positions to selectively cover the compartments 12, 14. The cover 32 includes a first section 34 that overlies or covers all or part of the first compartment 12, a second section 36 that overlies or covers all or part of the second compartment 14 and an intermediate section 38 between the first section 34 and second section 36. At least the first and second sections 34, 36 of the cover 32 are movable between and among various positions to define the positions of the cover 32. The cover 32 may be a unitary component with the first, second and intermediate sections 34, 36, 38 permanently connected together. That is, in at least some implementations, the sections of the cover 32 may move relative to one another, but they are not intended to be separated from each other. Of course, the sections 34, 36, 38 could be releasably coupled together by a releasable connector or connectors, like buttons, snaps, zipper, Velcro, clips or the like, so that one or more sections may be selectively removed from the others, if desired.

The first section 34 may include a main area 40 that overlies, covers and may define an upper boundary of the passenger compartment and the first section 34 may include a periphery at least a portion of which is releasably coupled to the vehicle 10 to retain the first section 34 over the passenger compartment 12. The periphery of the first section 34 may include or be defined by a first end 44 that may be arranged to be coupled to a cross-car extending support, such as the cross-beam extending between the A-pillars, opposite sides 46, 48 extending generally fore-aft and to the first end, and a second end 50 opposite the first end 44 and coupled to the intermediate section 38. When positioned over the passenger compartment 12, an inner surface 52 of the first section 34 faces inwardly toward and may define an upper surface/ceiling of the passenger compartment 12, and an outer surface 54 of the first section 34 may face outwardly away from the passenger compartment 12 and may define part of an exterior of the vehicle 10. The first section 34 may be retained in any suitable way, such as by one or more connectors, like buttons, snaps, zipper, hook and loop type fastener, clips or the like, or by a clamp, lock or other mechanism or arrangement.

The main area 40 may have any suitable shape, may be bowed to provide head room above the vehicle roof support structure, may be planar or otherwise generally arranged at the same height as the vehicle roof support structure, or may be otherwise arranged as desired. The first section 34 may be rigid, such that it does not fold or bend (or does not fold or bend easily), or flexible so that the first section 34 may be folded, bent, rolled or the like. The first section 34 may be formed from any suitable material or combination of materials, like a fabric, a single piece or multi-layer substrate, or a fabric received over or around a supporting substrate, by way of non-limiting examples.

The second section 36 may include a main area 56 that overlies, covers and may define an upper boundary of the cargo compartment 14 and the second section 36 may include a periphery at least a portion of which is releasably coupled to the vehicle, such as to upper portions of the sidewalls 26 and front wall 28 defining the cargo compartment 14, to retain the second section 36 in place over the cargo compartment 14. The periphery of the second section 36 may include or be defined by a first end 60 that is coupled to the intermediate section 38, opposite sides 62, 64 extending generally fore-aft and to the first end 60, and a second end 62 opposite the first end 60 and arranged at a rear of the cover, over or near the tailgate 30. When positioned over the cargo compartment 14, an inner surface 68 of the second section 36 faces inwardly toward and may define an upper surface/ceiling of the cargo compartment 14, and an outer surface 70 of the second section 36 may face outwardly away from the cargo compartment 14 and may define part of an exterior of the vehicle 10, The second section 36 may be retained on or to the vehicle in any suitable way, such as by one or more connectors, like buttons, snaps, zipper, hook and loop type fastener, clips or the like, or by a clamp, lock or other mechanism or arrangement.

The main area 56 of the second section 36 may have any suitable shape, may be bowed to provide additional cargo space above the vehicle cargo structure (e.g. walls 26, 28), may be planar or otherwise generally arranged at the same height as the vehicle cargo structure, or may be otherwise arranged as desired. The second section 36 may be rigid, such that it does not fold or bend (or does not fold or bend easily), or flexible so that the second section 36 may be folded, bent, rolled or the like. The second section 36 may be formed from any suitable material or combination of materials, like a fabric, a single piece or multi-layer substrate, or a fabric received over or around a supporting substrate, by way of non-limiting examples. In at least some implementations, the second section 36 may be formed of the same material(s) and in the same manner as the first section 34.

Figure 3:
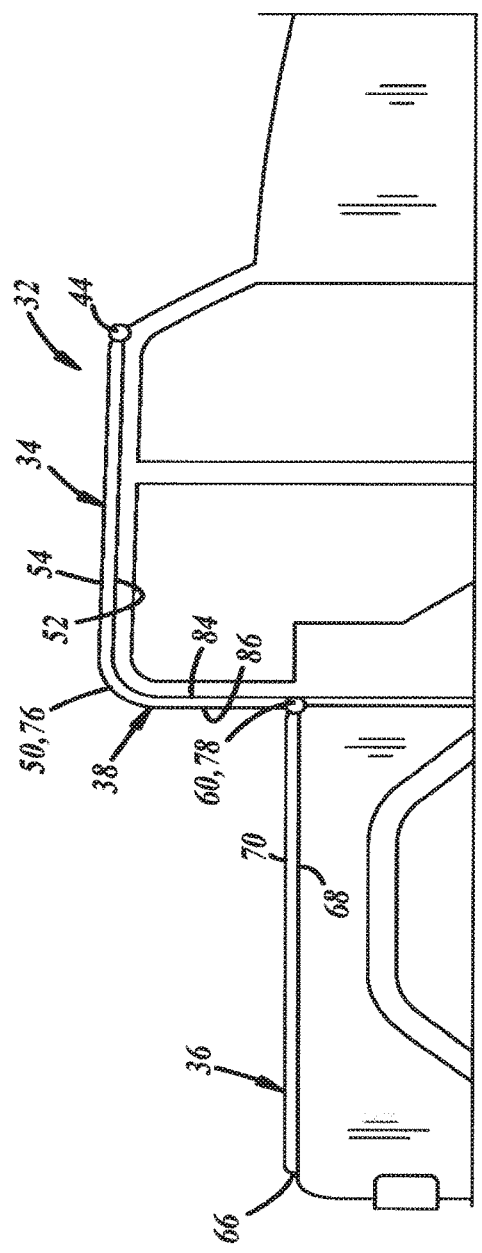
FIG. 3 is a diagrammatic partial side view of the vehicle with the cover in its first position, wherein a first section of the cover covers the passenger compartment, a second section of the cover covers the cargo compartment and an intermediate section covers a rear of the passenger compartment and interconnects the first and second sections.

The intermediate section 38 includes a main area 72 that overlies a portion of the passenger compartment 12, such as a rear portion of the passenger compartment 12 opposite the front of the passenger compartment which may include the windshield 22. Thus, the intermediate section 38 may define an outer/rear wall of the passenger compartment 12 when the intermediate section 38 is in a first position, as shown in FIGS. 1 and 3. The intermediate section 38 may include a periphery having a first end 76 coupled to the first section 34, a second end 78 coupled to the second section 36 and opposed sides 80, 82 at least a portion of which may be releasably coupled to the vehicle, such as to supports that define part of the passenger compartment 12 (e.g. pillars, posts, rails or brackets). When positioned as shown in FIGS. 1 and 3, an inner surface 84 of the intermediate section 38 faces inwardly toward and may define a rearmost surface of the passenger compartment, and an outer surface 86 of the intermediate section 38 may face outwardly away from the passenger compartment 14 and may define part of an exterior of the vehicle 10. At least when the intermediate section 38 defines a rear wall of the passenger compartment 12, the intermediate section 38 may include an opening 87 or a transparent portion, which may define a rear window or viewing area of the vehicle.

The intermediate section 38 may be continuous with the first section 34, and/or a bend, hinge, fold or joint may be provided between the intermediate section 38 and first section 34. The intermediate section 38 may also or instead be continuous with the second section 36, or a hinge, fold or joint may be provided between the intermediate section 38 and second section 36. The intermediate section 38 may be retained on or to the vehicle 10 in any suitable way, such as by one or more connectors, like buttons, snaps, zipper, hook and loop type fastener, clips or the like, or by a clamp, lock or other mechanism or arrangement. The main area 72 may have any suitable shape, may be bowed to provide additional space in the passenger compartment 12, may be planar or otherwise generally arranged at the same outward location as the vehicle support structure(s) to which it is connected, or may be otherwise arranged as desired. The intermediate section 38 may be rigid, such that it does not fold or bend (or does not fold or bend easily), or flexible so that the second section 36 may be folded, bent, rolled or the like. The intermediate section 38 may be formed from any suitable material or combination of materials, like a fabric, a single piece or multi-layer substrate, or a fabric received over or around a supporting substrate, by way of non-limiting examples. In at least some implementations, the intermediate section 38 may be formed of the same material(s) and in the same manner as either or both of the first section 34 and second section 36.

The cover 32 may be attached to the vehicle in more than one position or orientation to expose all or a portion of one or both of the passenger compartment 12 and the cargo compartment 14. As shown in FIG. 1, in a first position of the cover 32, the first section 34, second section 36 and intermediate section 38 may each be in a first position. In that position, the first section 34 may overlie or cover all or at least a portion of the passenger compartment 12 (e.g. may define a completely closed roof or only a partially closed roof of the vehicle). The second section 36 may overlie or cover all or at least a portion of the cargo compartment 14. And the intermediate section 38 may extend from the second section 36 to the first section 34 and enclose the rear of the passenger compartment 12. Bends, folds, hinges, seams or other transitions may exist between the sections 34, 36, 38. In at least some implementations, the cover 32 has a first effective surface in the first position, which may be a maximum effective surface area. That is, the first section 34 may be spaced from and not overlapping the second section 36, and the first and second section 36s may, in at least some implementations fully cover the passenger and cargo compartments.

In at least some implementations, the intermediate section 38 when in its first position is not parallel to and is at an angle of greater than sixty degrees relative to one or both of the first and second sections 34 and 36. In the implementation shown, the intermediate section 38 is generally perpendicular (where generally means within 10 degrees) to the first section 34 and second section 36 when the sections are in their respective first positions, with the first and second sections 34, 36 extending horizontally (e.g. generally parallel to a surface on which the vehicle is located) and the intermediate section 38 extending generally vertically.

The cover 32 may have a second position in which one or more of the first, second and intermediate sections 34, 36 and 38 are in respective second positions. In the second position, the cover 32 may have a second effective surface area that is less than the first effective surface area. While the collective surface area of the sections 34, 36, 38 doesn't change (i.e. the sections each have a certain surface area when expanded or fully open), the effective surface area of the cover 32 changes as sections 34, 36, 38 are fully or partially overlapped. With portions of the sections 34, 36, 38 overlapped, more of either or both of the compartments 12, 14 is/are exposed, that is, not covered by the cover 32.

Figure 5:
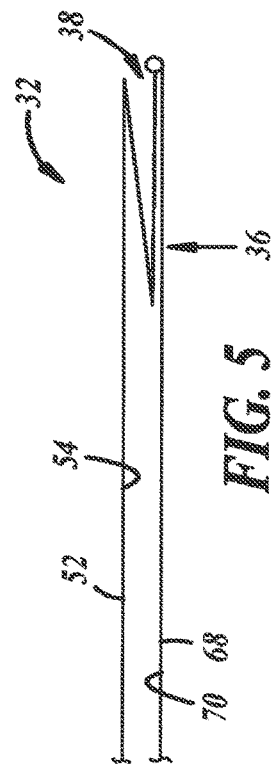
FIG. 5 is a diagrammatic side view of the cover in the position shown in FIG. 4.
Figure 4:
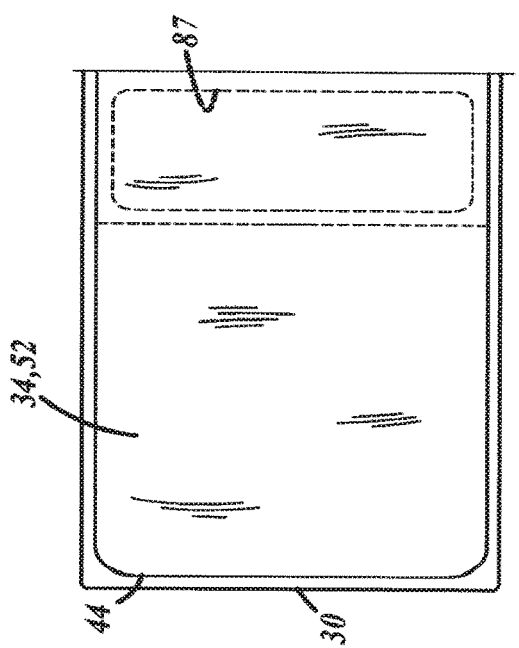
FIG. 4 is a partial plan view of showing the first section of the cover overlying the second section of the cover which is in its first position in which the second section covers the cargo compartment.
Figure 6:
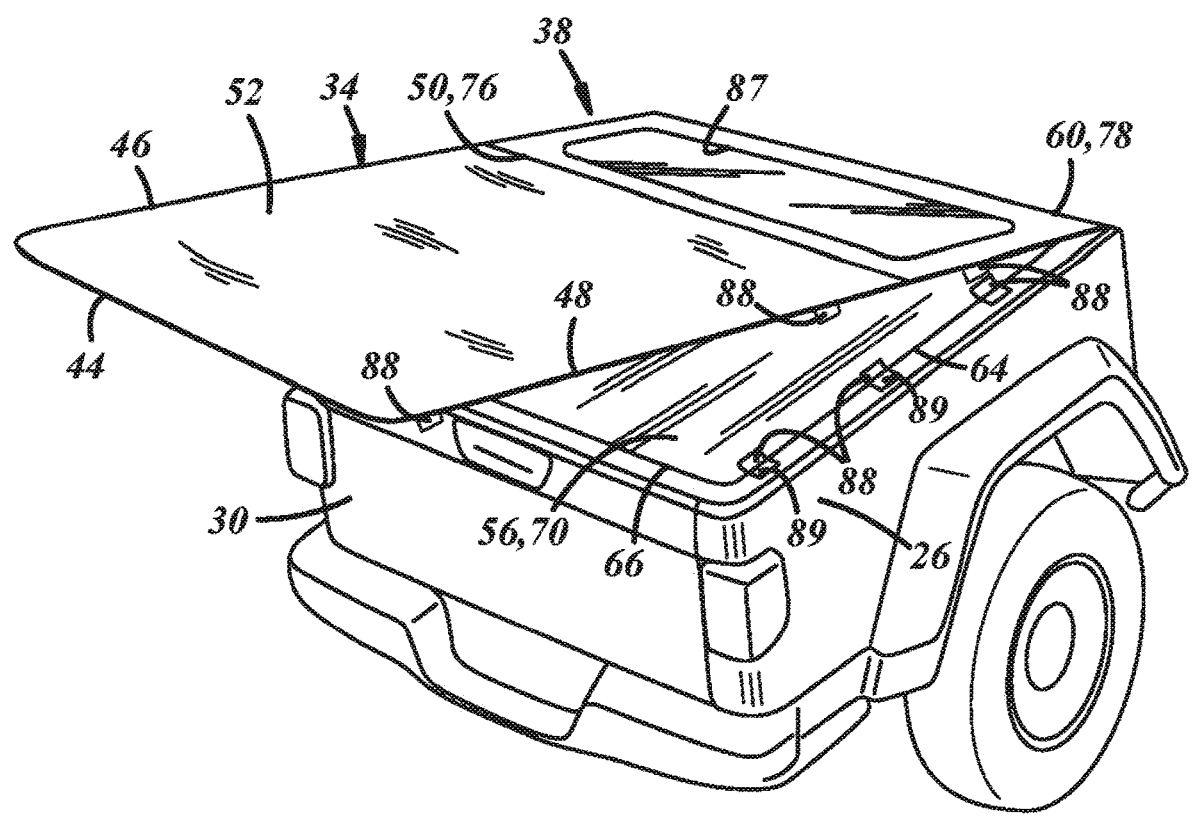
FIG. 6 is a partial rear perspective view of the vehicle showing the first and intermediate sections of the cover unfolded and the second section in its first position overlying the cargo compartment.

As shown in the implementation shown in FIGS. 4-6, in the second position of the cover 32, the second section 36 may remain in its first position and the first section 34 may be moved to a second position. In the second position of the first section 34, all or a portion of the passenger compartment's upper area is not overlapped by or covered by the first section 34. To uncover the upper portion of the passenger compartment 12, the first section 34 is folded or moved rearwardly so that the first section 34 at least partially overlies and is positioned on top of the second section 36. In more detail, the first section 34 is inverted so that its outer surface 54 is received adjacent to, overlaps and faces the outer surface 70 of the second section 36. The inner surface 52 of the first section 34 then defines part of the exterior of the vehicle 10, in the position shown in FIGS. 4-6. This overlapped position defines an effective surface area of the cover 32 that is less than when the cover 32 is in the first position. The intermediate section 38 may remain in its first position and still enclose the rear of the passenger compartment 12 (wherein the first section 34 may desirably be closely received over the intermediate section 38 and include a transparent portion overlapped with the transparent portion of the intermediate section 38), or the intermediate section 38 may be moved to its second position in which the intermediate section 38 also overlaps at least part of the second section 36, as best shown in FIGS. 4-6.

In FIGS. 4 and 5, the intermediate section 38 is received between the outer surface 70 of the second section 36 and a portion of the outer surface 54 of the first section 34. The first section 34 may be folded back on itself, as shown in FIG. 5, and one portion of the first section 34 may overlap another portion of the first section 34 that in turn overlaps all or part of the intermediate section 38 which in turn overlaps the second section 36. One or both of the first section 34 and intermediate section 38 may be coupled to the second section 36 and/or to the vehicle, to retain these sections in their second positions. In this way the connector or connectors 88 (FIG. 6) of the first section 34 and/or intermediate section 38 may be coupled to a connector or connectors 88 of the second section 36. The connectors 88 may be used to coupled the cover 32 to the vehicle 10, such as via complementary connectors 89 (as shown in FIGS. 1 and 6, and which may be in different locations and in different quantities) on the vehicle, or the connectors 88 may be used only to couple together the various sections 34, 36, 38 of the cover 32, or some combination of these two. The vehicle may include a track or other receiving feature that receives the cover and may sealingly or otherwise retain the cover to the vehicle, to more securely retain the cover on the vehicle.

Figure 2:
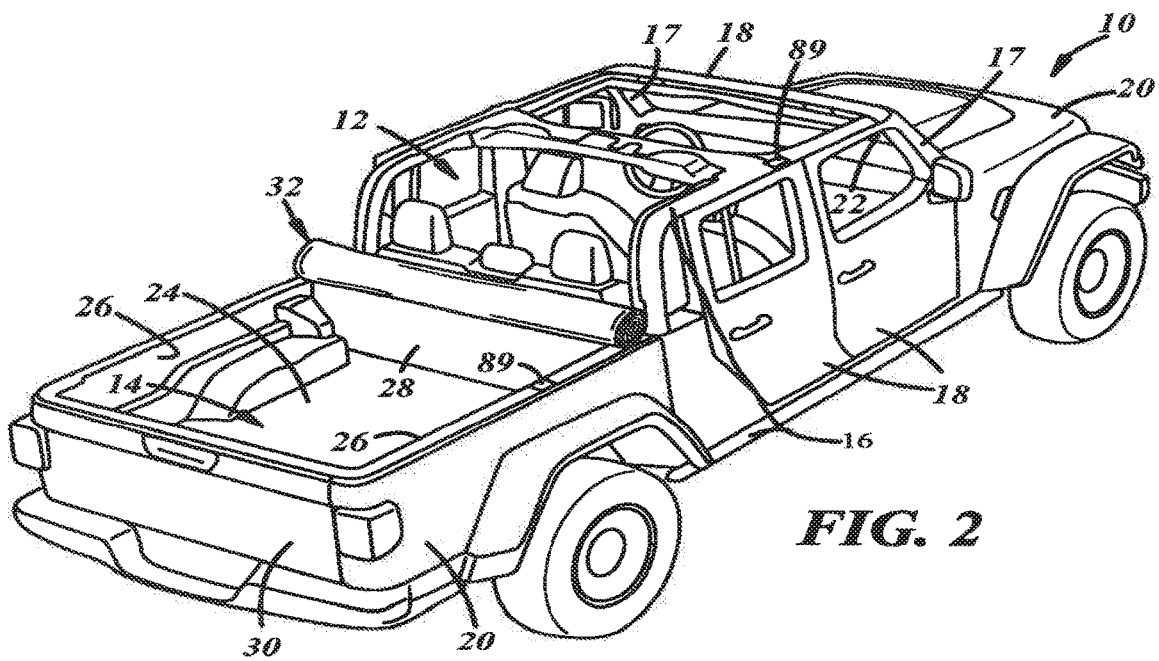
FIG. 2 is a perspective view of the vehicle with the cover in a second position in which both compartments are completely or mostly open and not covered by the cover.

The cover 32 may be arranged or oriented in other positions as well. For example, the second section 36 may be moved to a second position in which all or part of the cargo compartment 14 is uncovered while the first section 34 and intermediate section 38 are in their first positions or second positions. The first section 34 could be moved to a third position between the first and second positions, in which only part of the passenger compartment 12 is uncovered, such as by folding back toward the second section 36 only part of the first section 34. Still further, as shown in FIG. 2, in at least some implementations wherein the cover 32 is flexible, the cover 32 may be rolled up with the sections 34, 36, 38 rolled onto and overlapping each other so that both compartments are fully or substantially uncovered. The sections 34, 36, 38 could alternatively be folded several times to reduce the effective surface area to a minimum, as desired. Ties, straps or other connectors may be secured to the cover 32 to maintain the cover 32 in this minimum effective surface area position, or in other positions, as desired.

Previously, convertible tops were stored in the cargo compartment 14 when not deployed over the passenger compartment 12 which consumed some or all of the volume of the cargo compartment 14. Or the passenger compartment roof panels or covers, which were separate from any cargo compartment cover, were removed from the vehicle 10 and not carried by, coupled to or transported with the vehicle when the vehicle was moved. Further, if desired to uncover the cargo compartment 14, then such cargo covers were removed from the vehicle 10 not carried by, coupled to or transported with the vehicle when the vehicle was moved. Then, when the vehicle was located remote from the area in which the roof or cargo covers were stored, there was no way to protect people or items from foul weather.

The multi-position cover disclosed herein permits selective covering of multiple vehicle compartments without consuming space/volume in either compartment when deployed or when in a fully or partially removed position. With all or most of the passenger and cargo compartment volume available, the cover 32 may be taken on vehicle trips without compromising vehicle interior or storage space, and the cover 32 can be on hand if a situation occurs wherein covering the passenger and/or cargo compartment becomes desirable. Further, the integral or otherwise connected together sections facilitate use of the cover 32 and securing and retaining the cover 32 in its various positions or orientations. Otherwise two or more separate panels or covers are needed for the roof, rear window/wall, and cargo compartment, and such separate components have to be separately stored (at the expense of cargo space or separately from the vehicle and thus, not available) and separately moved among various positions.

What is claimed is:

1. A cover for a vehicle having a first compartment and a second compartment spaced from the first compartment, the cover includes:
    a first section having a first position and a second position, the first section being adapted to overlie the first compartment;
    a second section having a first position and a second position; and
    an intermediate section located between the first section and the second section, wherein the cover has a first position defining a first effective surface area of the cover, and when the cover is in the first position, the first section is in its first position, the second section is in its first position, and the intermediate section is not parallel to the first section and second section, and the cover has a second position defining a second effective surface area that is less than the first effective surface area, and when the cover is in the second position, either or both of the first section and the second section is in its second position.

2. The cover of claim 1 wherein the intermediate section is connected at a first end to the first section and the intermediate section is connected at a second end to the second section.

3. The cover of claim 1 wherein at least a portion of the intermediate section is transparent or includes an opening without material covering the opening.

4. The cover of claim 1 wherein the first section includes a main area and the second section includes a main area, and the main area of the first section does not overlap the main area of the second section in the first position of the first section, and the main area of the first section overlaps at least part of the main area of the second section in the second position of the first section.

5. The cover of claim 4 wherein the main area of the first section is complementary in orientation to the main area of the second section when the second section is in its first position and the first section is in its second position.

6. The cover of claim 5 wherein the first section hinges or bends relative to the intermediate section at a joint or transition between the first section and intermediate section, and the intermediate section hinges or bends relative to the second section at a joint or transition between the intermediate section and the second section.

7. The cover of claim 6 wherein the cover is alternately folded about the joints to position the intermediate section between the first section and second section when the first section is in its second position.

8. The cover of claim 1 wherein, in the second position of the first section, the first section may be rolled upon itself or upon one or both of the intermediate section and second section, and the first section has a first effective surface area in the first position and the first section has a second effective surface area that is smaller than the first surface area when the first section is in the second position.

9. The cover of claim 1 wherein, in the second position of the second section, the second section may be rolled upon itself or upon one or both of the intermediate section and first section, and the second section has a first effective surface area in the first position and the second section has a second effective surface area that is smaller than the first surface area when the second section is in the second position.

10. The cover of claim 1 wherein the first section may be in the first or second position when the second section is in the first or second position.

11. The cover of claim 4 wherein the first section includes a connector that is releasably connected to a connector of the second section when the first section is in its second position and the second section is in its first position.

12. A vehicle, including:
a passenger compartment arranged to contain one or more occupants;
a second compartment located at least partially spaced from the passenger compartment; and
a cover having:
a first section that in a first position overlies at least part of the passenger compartment and in a second position overlies either 1) less of the passenger compartment than when in the first position, or 2) overlies at least part of the second compartment;
a second section that in a first position overlies at least part of the second compartment and in a second position is connected to the vehicle and overlies less of the second compartment than when in the first position; and
an intermediate section interconnecting the first section and the second section, the intermediate section has a main area that in a first position of the intermediate section is not covered by either of the first section and the second section, and when the intermediate section is in a second position the main area overlaps part of the vehicle and is covered by one or both of the first section and second section.

13. The vehicle of claim 12 which also includes a connector coupled to the first section and wherein the vehicle includes a mating connector that when coupled to the connector coupled to the first section retains the first section in its first position.

14. The vehicle of claim 12 which also includes a connector coupled to the second section and wherein the vehicle includes a mating connector that when coupled to the connector coupled to the second section retains the second section in its first position.

15. The vehicle of claim 12 wherein the first section may be moved to its second position wherein the first section is received over the second section when the second section is in its first position, and wherein the first section and/or second section includes a connector to couple the first section to the second section when the first section is in its second position and the second section is in its first position.

* * * * *